(12) United States Patent
Furukawa et al.

(10) Patent No.: US 8,273,135 B2
(45) Date of Patent: Sep. 25, 2012

(54) METHOD OF MANUFACTURING SOLID ELECTROLYTIC CAPACITOR

(75) Inventors: Takeshi Furukawa, Kanzaki (JP); Yuichiro Inutsuka, Isahaya (JP)

(73) Assignees: SANYO Electric Co., Ltd., Moriguchi-shi, Osaka (JP); Saga Sanyo Industries Co., Ltd., Kishima-gun, Saga (JP)

( * ) Notice: Subject to any disclaimer, the term of this patent is extended or adjusted under 35 U.S.C. 154(b) by 182 days.

(21) Appl. No.: 12/574,276

(22) Filed: Oct. 6, 2009

(65) Prior Publication Data

US 2010/0107386 A1 May 6, 2010

(30) Foreign Application Priority Data

Nov. 5, 2008 (JP) ................................. 2008-284474

(51) Int. Cl.
*H01G 9/00* (2006.01)
(52) U.S. Cl. .................... 29/25.03; 29/825; 361/523
(58) Field of Classification Search ............... 29/25.03, 29/825; 361/523
See application file for complete search history.

(56) References Cited

U.S. PATENT DOCUMENTS

| | | | |
|---|---|---|---|
| 5,729,428 A * | 3/1998 | Sakata et al. | 361/523 |
| 6,215,651 B1 * | 4/2001 | Takada et al. | 361/523 |
| 6,324,051 B1 * | 11/2001 | Igaki et al. | 361/523 |
| 6,442,016 B2 * | 8/2002 | Fukuyama et al. | 361/523 |
| 6,864,147 B1 * | 3/2005 | Fife et al. | 438/399 |
| 7,027,292 B2 * | 4/2006 | Anzai et al. | 361/530 |
| 7,126,812 B2 * | 10/2006 | Hirata et al. | 361/524 |
| 2007/0183120 A1 | 8/2007 | Fujimoto et al. | |

FOREIGN PATENT DOCUMENTS

| CN | 101017735 A | 8/2007 |
|---|---|---|
| JP | 10-144574 A | 5/1998 |

OTHER PUBLICATIONS

Chinese Office Action issued in Application No. 200910174952.4, dated Mar. 1, 2012.

* cited by examiner

*Primary Examiner* — Carl Arbes
(74) *Attorney, Agent, or Firm* — Westerman, Hattori, Daniels & Adrian, LLP

(57) ABSTRACT

Provided is a method of manufacturing a solid electrolytic capacitor including a capacitor element, the capacitor element having an anode body with a dielectric coating film formed on a surface thereof and a solid electrolyte made of a conductive polymer. The method includes the steps of: forming the capacitor element having the anode body with the dielectric coating film formed on the surface thereof; preparing a polymerization liquid A containing one of a monomer as a precursor of the conductive polymer and an oxidant, and a silane compound; preparing a polymerization liquid B by adding the other of the monomer and the oxidant that is not contained in polymerization liquid A, to polymerization liquid A; and performing polymerization after impregnating the capacitor element with polymerization liquid B.

6 Claims, 2 Drawing Sheets

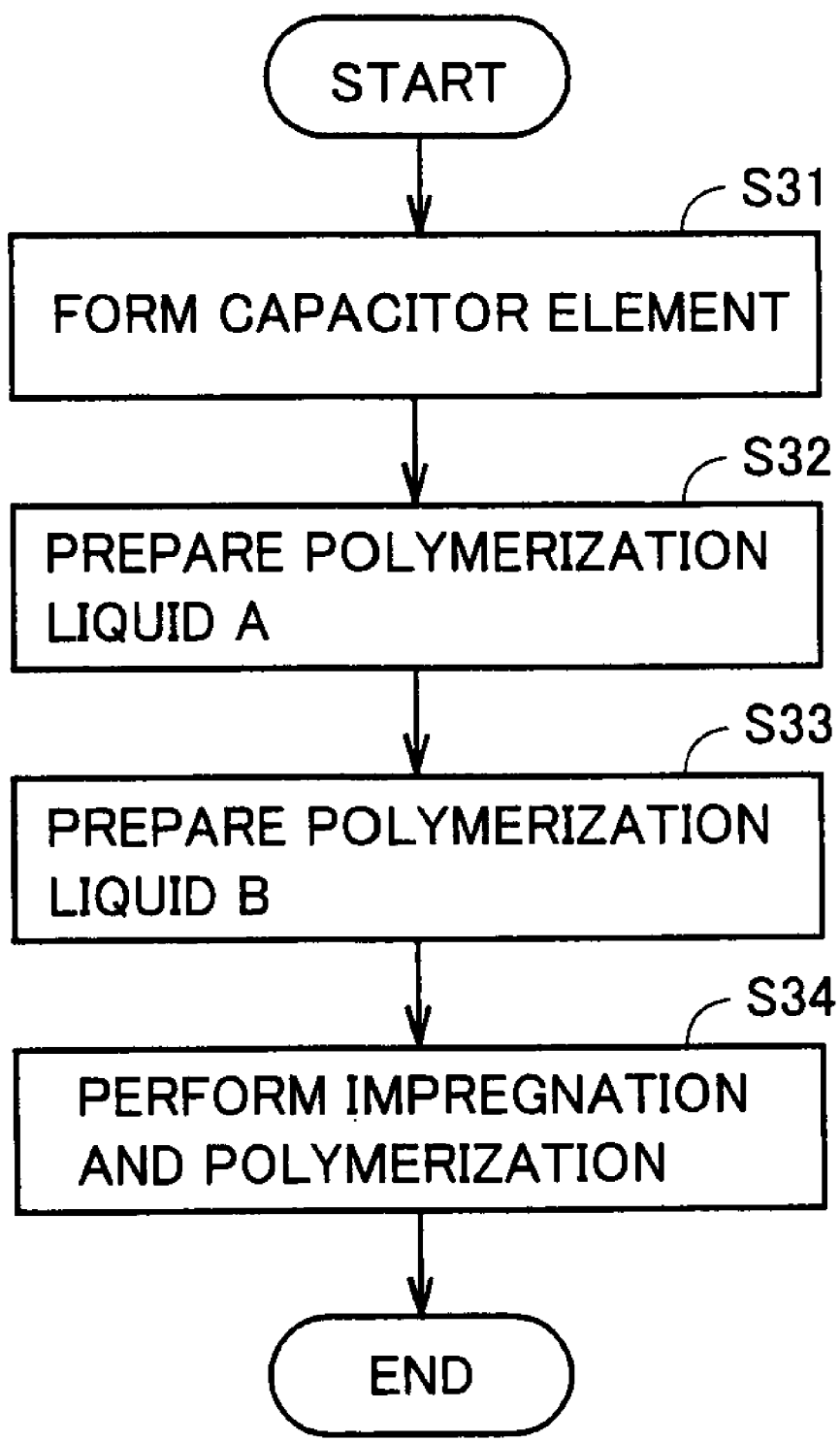

METHOD OF MANUFACTURING SOLID ELECTROLYTIC CAPACITOR

BACKGROUND OF THE INVENTION

1. Field of the Invention

The present invention relates to a method of manufacturing a solid electrolytic capacitor.

2. Description of the Background Art

As a typical solid electrolytic capacitor, the one shown in FIGS. 1 and 2 is known (Japanese Patent Laying-Open No. 10-144574).

As shown in a cross sectional view of FIG. 1, a solid electrolytic capacitor 1 has a capacitor element 6 having leads 8A and 8B, a bottomed case 9 accommodating capacitor element 6, and a sealing member 10 sealing capacitor element 6. The vicinity of an opening end of bottomed case 9 is subjected to pressing in a lateral direction and curling.

As shown in a perspective view of FIG. 2, capacitor element 6 is formed by winding an anode body 2 having a dielectric coating film formed on a surface thereof and a cathode body 3 together, with a separator 12 being interposed therebetween, and thereafter securing the wound object with a winding stop tape 5, Anode lead 8A is connected with anode body 2 through an anode lead tab 7A, and cathode lead 8B is connected with cathode body 3 through a cathode lead tab 7B.

As an electrolyte of solid electrolytic capacitor 1 with a configuration as described above, for example, a solid electrolyte made of a conductive polymer is used. Such an electrolyte is charged into a gap between anode body 2 and cathode body 3 as electrode foils of capacitor element 6.

SUMMARY OF THE INVENTION

As digitization of electronic equipment proceeds recently, solid electrolytic capacitors as described above have been required to have a smaller size, a larger capacity, and a lower ESR. Herein, ESR refers to an equivalent series resistance.

Further, solid electrolytic capacitors used for on-vehicle equipment and industrial equipment used in a severe environment have been required to have a high voltage proof property. Conventionally, examples of a method of causing a solid electrolytic capacitor to have a high voltage proof property includes a method of causing a dielectric coating film formed on a surface of an anode body to have a high voltage proof property by increasing chemical conversion voltage applied during chemical conversion treatment for forming the dielectric coating film. However, when the chemical conversion voltage is increased, there occur problems such as increase of leak current due to degradation in leak current property, occurrence of a short circuit, and the like.

One object of the present invention is to provide a method of manufacturing a solid electrolytic capacitor using a conductive polymer as a solid electrolyte, in which increase of leak current and occurrence of a short circuit are suppressed, and which has a high voltage proof property.

A first aspect of the present invention is a method of manufacturing a solid electrolytic capacitor including a capacitor element, the capacitor element having an anode body with a dielectric coating film formed on a surface thereof and a solid electrolyte made of a conductive polymer, the method including the steps of: forming the capacitor element having the anode body with the dielectric coating film formed on the surface thereof; preparing a polymerization liquid A containing a monomer as a precursor of the conductive polymer and a silane compound; preparing a polymerization liquid B by adding an oxidant to polymerization liquid A; and performing polymerization after impregnating the capacitor element with polymerization liquid B.

A second aspect of the present invention is a method of manufacturing a solid electrolytic capacitor including a capacitor element, the capacitor element having an anode body with a dielectric coating film formed on a surface thereof and a solid electrolyte made of a conductive polymer, the method including the steps of: forming the capacitor element having the anode body with the dielectric coating film formed on the surface thereof; preparing a polymerization liquid A containing an oxidant and a silane compound; preparing a polymerization liquid B by adding a monomer as a precursor of the conductive polymer to polymerization liquid A; and performing polymerization after impregnating the capacitor element with polymerization liquid B.

Preferably, the silane compound has a concentration of 5 to 20 wt % relative to a total weight of the monomer as the precursor of the conductive polymer, the oxidant, and the silane compound.

Preferably, in the step of preparing polymerization liquid B, polymerization liquid B is prepared when polymerization liquid A has a temperature of 5 to 40° C.

According to the present invention, a solid electrolytic capacitor using a conductive polymer as a solid electrolyte, in which increase of leak current and occurrence of a short circuit are suppressed, and which has a high voltage proof property and high reliability can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart showing a manufacturing process of the present invention.

DESCRIPTION OF THE PREFERRED EMBODIMENTS

Figure 1:
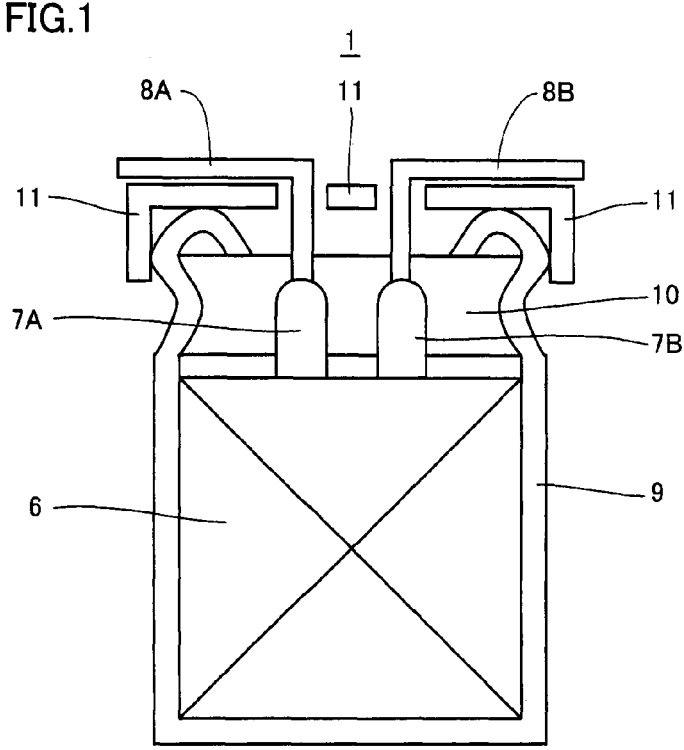
FIG. 1 is a cross sectional view of a typical solid electrolytic capacitor.

In FIG. 1, solid electrolytic capacitor 1 includes capacitor element 6, lead tabs 7A and 7B, leads 8A and 8B, bottomed case 9, sealing member 10, and a seat plate 11. Leads 8A and 8B are connected to capacitor element 6 through lead tabs 7A and 7B, respectively. Capacitor element 6 is accommodated in bottomed case 9 such that a surface thereof onto which lead tabs 7A and 7B are connected is disposed at an opening end portion of bottomed case 9. Capacitor element 6 is sealed by disposing sealing member 10 at the opening end portion of bottomed case 9.

Figure 2:
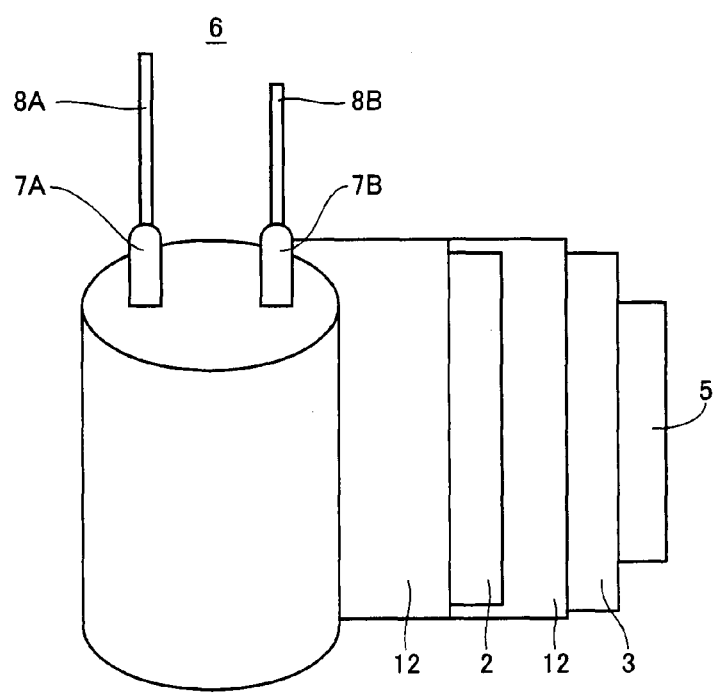
FIG. 2 is a perspective view of a capacitor element in the typical solid electrolytic capacitor.

As shown in FIG. 2, capacitor element 6 includes anode body 2 connected with anode lead tab 7A, cathode body 3 connected with cathode lead tab 7B, and separator 12. A dielectric coating film is formed on a surface of anode body 2. A dielectric coating film may also be formed on a surface of cathode body 3, as with anode body 2.

A solid electrolyte layer made of a conductive polymer is formed in capacitor element 6. The solid electrolyte layer is formed by chemically polymerizing a monomer in a solution containing the monomer, an oxidant, and a silane compound. The formed solid electrolyte layer has a configuration in which the silane compound is contained in the conductive polymer. The silane compound has functions of improving molecular weight distribution and crystallinity of the conductive polymer, and strengthening binding of a conductive polymer chain by a cross-linking effect. As a result, leak current property and voltage proof property of the solid electrolytic capacitor are improved.

Next, the steps of the manufacturing method of the present invention will be described with reference to FIG. 3.

In FIG. 3, firstly, capacitor element 6 is formed (step S31). The outer shape of capacitor element 6 can be formed using a conventional method. Thereby, the capacitor element including anode body 2 having a dielectric coating film formed thereon, cathode body 3, and lead tabs 7A and 7B connected to electrode bodies 2 and 3, respectively, is formed.

Next, a polymerization liquid A is prepared by mixing one of a monomer and an oxidant with a silane compound (step S32). Then, a polymerization liquid B is prepared by adding the other (i.e., the other of the monomer and the oxidant that is not contained in polymerization liquid A) to polymerization liquid A (step S33).

It is important to prepare polymerization liquid A by mixing one of the monomer and the oxidant with the silane compound beforehand, and thereafter prepare polymerization liquid B by adding the other (i.e., the other of the monomer and the oxidant that is not contained in polymerization liquid A) to polymerization liquid A, as described above. This is because, if the monomer, the oxidant, and the silane compound are mixed simultaneously, or if the monomer and the oxidant are mixed and thereafter the silane compound is mixed, a conductive polymer with a stable property is less likely to be obtained due to influence of heat of reaction, and the silane compound cannot be added in large amount.

Further, since the temperature of polymerization liquid A is increased by the heat of reaction after the preparation thereof, it is preferable to prepare polymerization liquid B using polymerization liquid A after the temperature of polymerization liquid A is stabilized at 5 to 40° C. If polymerization liquid A having a temperature of less than 5° C. is used, moisture incorporation due to condensation and solvent solidification may occur, and if polymerization liquid A having a temperature of more than 40° C. is used, the polymerization reaction in step S33 may not be stabilized.

As the silane compound used in the present invention, vinyltrichlorosilane, vinyltrimethoxysilane, vinyltriethoxysilane, β-(3,4-epoxy-cyclohexyl) ethyltrimethoxysilane, γ-glycidoxypropyltrimethoxysilane, γ-glycidoxypropyltriethoxysilane, γ-methacryloxypropyltrimethoxysilane, γ-glycidoxypropylmethyldiethoxysilane, p-styryltrimethoxysilane, γ-methacryloxypropylmethyldimethoxysilane, γ-methacryloxypropylmethyldiethoxysilane, γ-methacryloxypropyltriethoxysilane, γ-acryloxypropyltrimethoxysilane, N-2-(aminoethyl) γ-aminopropylmethyldimethoxysilane, N-2-(aminoethyl) γ-aminopropyltrimethoxysilane, N-2-(aminoethyl) γ-aminopropyltriethoxysilane, γ-aminopropyltrimethoxysilane, γ-aminopropyltriethoxysilane, N-phenyl-3-aminopropyltrimethoxysilane, γ-chloropropyltrimethoxysilane, γ-mercaptopropylmethyldimethoxysilane, γ-mercaptopropyltrimethoxysilane, or the like is preferable. β-(3,4-epoxy-cyclohexyl)ethyltrimethoxysilane, γ-acryloxypropyltrimethoxysilane, γ-glycidoxypropyltrimethoxysilane, γ-methacryloxypropyltrimethoxysilane, γ-glycidoxypropylmethyldiethoxysilane, or γ-glycidoxypropyltriethoxysilane is more preferable. Further, two or more of the silane compounds may be combined and used.

Preferably, the silane compound contained in the conductive polymer has a concentration of 5 to 20 wt %, when a total weight of the monomer, the oxidant, and the silane compound is represented as 100 wt %. Since the influence of the heat of reaction caused by addition of the silane compound is extremely reduced in the method of preparing the polymerization liquid of the present invention, the silane compound can be used in large amount. By increasing the concentration of the silane compound in the conductive polymer, leak current property and voltage proof property of the solid electrolytic capacitor can be improved.

The conductive polymer that can be used in the present invention preferably contains at least one or more conductive polymers of the aliphatic series, the aromatic series, the heterocyclic series, and the heteroatom-containing series. In particular, a polythiophene, polyaniline, or polypyrrole conductive polymer is preferable.

As the oxidant, a conventionally known oxidant compound including ferric p-toluenesulfonic acid, or an oxidant solution prepared by dissolving the oxidant compound in alcohol such as ethanol, butanol, or the like can be used. When an oxidant solution is used as an oxidant, it is preferable to prepare the oxidant solution such that an oxidant compound in the oxidant solution has a concentration of 35 to 70 wt %.

Then, after capacitor element 6 is impregnated with polymerization liquid B prepared as described above, chemical polymerization is performed (step S34) to form a solid electrolyte in capacitor element 6. Instead of impregnating capacitor element 6 with polymerization liquid B, polymerization liquid B may be applied to capacitor element 6. Capacitor element 6 fabricated as described above is accommodated in bottomed case 9, and the opening end portion of bottomed case 9 is sealed with sealing member 10 to complete solid electrolytic capacitor 1.

EXAMPLE 1

Firstly, etching treatment was performed on surfaces of anode body 2 and cathode body 3 made of aluminum foil. Thereafter, a dielectric coating film was formed on the surface of anode body 2 by immersing anode body 2 subjected to etching treatment in a chemical conversion solution and applying a voltage of 150 V.

Anode lead tab 7A and cathode lead tab 7B were connected to anode body 2 and cathode body 3, respectively. Then, anode body 2 and cathode body 3 were wound together with separator 12, and the outermost periphery was secured with winding stop tape 5 to fabricate capacitor element 6.

Subsequently, capacitor element 6 was subjected to chemical conversion treatment of a cut section. Chemical conversion treatment of a cut section was performed by immersing capacitor element 6 in a chemical conversion solution and applying voltage.

Then, a polymerization liquid for a conductive polymer as a solid electrolyte was prepared. As a monomer, 3,4-ethylenedioxythiophene was used. As an oxidant, a butanol solution of ferric p-toluenesulfonic acid was used. As a silane compound, γ-acryloxypropyltrimethoxysilane was used. Weight percentages of ferric p-toluenesulfonic acid and butanol in the oxidant were set to 40 wt % and 60 wt %, respectively. Weight percentages of the monomer, the oxidant, and the silane compound in the polymerization liquid were set to 25 wt %, 74 wt %, and 1 wt %, respectively.

To prepare the polymerization liquid, firstly, polymerization liquid A was prepared by mixing ferric p-toluenesulfonic acid and γ-acryloxypropyltrimethoxysilane. Thereafter, polymerization liquid B was prepared by adding 3,4-ethylenedioxythiophene to polymerization liquid A.

Then, capacitor element 6 was impregnated with polymerization liquid B and subjected to thermochemical polymerization to form a solid electrolyte layer made of a conductive polymer inside capacitor element 6.

Thereafter, capacitor element 6 was accommodated in bottomed case 9, and sealing member 10 was inserted into the opening end portion of bottomed case 9, which was then subjected to pressing in a lateral direction and curling. Then, seat plate 11 was provided on a curled surface, and leads 8A and 8B were pressed and bent to fabricate solid electrolytic capacitor 1.

EXAMPLE 2

A solid electrolytic capacitor was fabricated as in Example 1 except for setting the weight percentages of the monomer, the oxidant, and the silane compound to 25 wt %, 72 wt %, and 3 wt %, respectively.

EXAMPLE 3

A solid electrolytic capacitor was fabricated as in Example 1 except for setting the weight percentages of the monomer, the oxidant, and the silane compound to 25 wt %, 70 wt %, and 5 wt %, respectively.

EXAMPLE 4

A solid electrolytic capacitor was fabricated as in Example 1 except for setting the weight percentages of the monomer, the oxidant, and the silane compound to 25 wt %, 65 wt %, and 10 wt %, respectively.

EXAMPLE 5

A solid electrolytic capacitor was fabricated as in Example 1 except for setting the weight percentages of the monomer, the oxidant, and the silane compound to 25 wt %, 60 wt %, and 15 wt %, respectively.

EXAMPLE 6

A solid electrolytic capacitor was fabricated as in Example 1 except for setting the weight percentages of the monomer, the oxidant, and the silane compound to 25 wt %, 55 wt %, and 20 wt %, respectively.

EXAMPLE 7

A solid electrolytic capacitor was fabricated as in Example 1 except for setting the weight percentages of the monomer, the oxidant, and the silane compound to 25 wt %, 50 wt %, and 25 wt %, respectively.

EXAMPLE 8

A solid electrolytic capacitor was fabricated as in Example 1 except for using γ-glycidoxypropyltrimethoxysilane as the silane compound.

EXAMPLE 9

A solid electrolytic capacitor was fabricated as in Example 2 except for using γ-glycidoxypropyltrimethoxysilane as the silane compound.

EXAMPLE 10

A solid electrolytic capacitor was fabricated as in Example 3 except for using γ-glycidoxypropyltrimethoxysilane as the silane compound.

EXAMPLE 11

A solid electrolytic capacitor was fabricated as in Example 4 except for using γ-glycidoxypropyltrimethoxysilane as the silane compound.

EXAMPLE 12

A solid electrolytic capacitor was fabricated as in Example 5 except for using γ-glycidoxypropyltrimethoxysilane as the silane compound.

EXAMPLE 13

A solid electrolytic capacitor was fabricated as in Example 6 except for using γ-glycidoxypropyltrimethoxysilane as the silane compound.

EXAMPLE 14

A solid electrolytic capacitor was fabricated as in Example 7 except for using γ-glycidoxypropyltrimethoxysilane as the silane compound.

EXAMPLE 15

A solid electrolytic capacitor was fabricated as in Example 1 except for setting the weight percentages of the monomer, the oxidant, and the silane compound to 24 wt %, 75 wt %, and 1 wt %, respectively, and preparing the polymerization liquid by firstly preparing polymerization liquid A by mixing 3,4-ethylenedioxythiophene and γ-acryloxypropyltrimethoxysilane, and then preparing polymerization liquid B by adding ferric p-toluenesulfonic acid to polymerization liquid A.

EXAMPLE 16

A solid electrolytic capacitor was fabricated as in Example 15 except for setting the weight percentages of the monomer, the oxidant, and the silane compound to 20 wt %, 75 wt %, and 5 wt %, respectively.

EXAMPLE 17

A solid electrolytic capacitor was fabricated as in Example 15 except for setting the weight percentages of the monomer, the oxidant, and the silane compound to 15 wt %, 75 wt %, and 10 wt %, respectively.

EXAMPLE 18

A solid electrolytic capacitor was fabricated as in Example 15 except for setting the weight percentages of the monomer, the oxidant, and the silane compound to 5 wt %, 75 wt %, and 20 wt %, respectively.

COMPARATIVE EXAMPLE 1

A solid electrolytic capacitor was fabricated as in Example 1 except for not preparing polymerization liquid A, setting the weight percentages of the monomer and the oxidant to 25 wt % and 75 wt %, respectively, and using a mixed solution prepared by mixing 3,4-ethylenedioxythiophene and ferric p-toluenesulfonic acid, as polymerization liquid B.

COMPARATIVE EXAMPLE 2

A solid electrolytic capacitor was fabricated as in Example 3 except for not preparing polymerization liquid A, and using a mixed solution prepared by simultaneously mixing 3,4-ethylenedioxythiophene, ferric p-toluenesulfonic acid, and γ-acryloxypropyltrimethoxysilane, as polymerization liquid B.

COMPARATIVE EXAMPLE 3

A solid electrolytic capacitor was fabricated as in Example 4 except for not preparing polymerization liquid A, and using a mixed solution prepared by simultaneously mixing 3,4-ethylenedioxythiophene, ferric p-toluenesulfonic acid, and γ-acryloxypropyltrimethoxysilane, as polymerization liquid B.

COMPARATIVE EXAMPLE 4

A solid electrolytic capacitor was fabricated as in Example 6 except for not preparing polymerization liquid A, and using a mixed solution prepared by simultaneously mixing 3,4- ethylenedioxythiophene, ferric p-toluenesulfonic acid, and γ-acryloxypropyltrimethoxysilane, as polymerization liquid B.

Table 1 shows a list of conditions for the polymerization liquids in the examples and the comparative examples described above. It is to be noted that 20 solid electrolytic capacitors were fabricated for each of the examples and the comparative examples.

35 V, a capacitance of 22 μF, and dimensions of 10 mm in diameter and 12 mm in height. The short circuit occurrence ratio indicates a short circuit occurrence ratio after performing aging treatment at 125° C. for five hours. The capacitance and the dielectric loss tangent were measured at a frequency of 120 Hz, and the ESR was measured at a frequency of 100 kHz. Further, the leak current indicates a value obtained two

TABLE 1

|  | Silane Compound | Polymerization Liquid Preparation Method | | Weight Percentage (wt %) | | |
|---|---|---|---|---|---|---|
|  |  | Polymerization Liquid A | Polymerization Liquid B | Monomer | Oxidant | Silane Compound |
| Example 1 | γ-acryloxypropyltrimethoxysilane | Oxidant + Silane Compound | Polymerization Liquid A + Monomer | 25 | 74 | 1 |
| Example 2 | γ-acryloxypropyltrimethoxysilane | Oxidant + Silane Compound | Polymerization Liquid A + Monomer | 25 | 72 | 3 |
| Example 3 | γ-acryloxypropyltrimethoxysilane | Oxidant + Silane Compound | Polymerization Liquid A + Monomer | 25 | 70 | 5 |
| Example 4 | γ-acryloxypropyltrimethoxysilane | Oxidant + Silane Compound | Polymerization Liquid A + Monomer | 25 | 65 | 10 |
| Example 5 | γ-acryloxypropyltrimethoxysilane | Oxidant + Silane Compound | Polymerization Liquid A + Monomer | 25 | 60 | 15 |
| Example 6 | γ-acryloxypropyltrimethoxysilane | Oxidant + Silane Compound | Polymerization Liquid A + Monomer | 25 | 55 | 20 |
| Example 7 | γ-acryloxypropyltrimethoxysilane | Oxidant + Silane Compound | Polymerization Liquid A + Monomer | 25 | 50 | 25 |
| Example 8 | γ-glycidoxypropyltrimethoxysilane | Oxidant + Silane Compound | Polymerization Liquid A + Monomer | 25 | 74 | 1 |
| Example 9 | γ-glycidoxypropyltrimethoxysilane | Oxidant + Silane Compound | Polymerization Liquid A + Monomer | 25 | 72 | 3 |
| Example 10 | γ-glycidoxypropyltrimethoxysilane | Oxidant + Silane Compound | Polymerization Liquid A + Monomer | 25 | 70 | 5 |
| Example 11 | γ-glycidoxypropyltrimethoxysilane | Oxidant + Silane Compound | Polymerization Liquid A + Monomer | 25 | 65 | 10 |
| Example 12 | γ-glycidoxypropyltrimethoxysilane | Oxidant + Silane Compound | Polymerization Liquid A + Monomer | 25 | 60 | 15 |
| Example 13 | γ-glycidoxypropyltrimethoxysilane | Oxidant + Silane Compound | Polymerization Liquid A + Monomer | 25 | 55 | 20 |
| Example 14 | γ-glycidoxypropyltrimethoxysilane | Oxidant + Silane Compound | Polymerization Liquid A + Monomer | 25 | 50 | 25 |
| Example 15 | γ-acryloxypropyltrimethoxysilane | Monomer + Silane Compound | Polymerization Liquid A + Oxidant | 24 | 75 | 1 |
| Example 16 | γ-acryloxypropyltrimethoxysilane | Monomer + Silane Compound | Polymerization Liquid A + Oxidant | 20 | 75 | 5 |
| Example 17 | γ-acryloxypropyltrimethoxysilane | Monomer + Silane Compound | Polymerization Liquid A + Oxidant | 15 | 75 | 10 |
| Example 18 | γ-acryloxypropyltrimethoxysilane | Monomer + Silane Compound | Polymerization Liquid A + Oxidant | 5 | 75 | 20 |
| Comparative Example 1 | — | — | Monomer + Oxidant | 25 | 75 | — |
| Comparative Example 2 | γ-acryloxypropyltrimethoxysilane | — | Monomer + Oxidant + Silane Compound | 25 | 70 | 5 |
| Comparative Example 3 | γ-acryloxypropyltrimethoxysilane | — | Monomer + Oxidant + Silane Compound | 25 | 65 | 10 |
| Comparative Example 4 | γ-acryloxypropyltrimethoxysilane | — | Monomer + Oxidant + Silane Compound | 25 | 55 | 20 |

Table 2 shows measurement results of electric properties indicating average values of 20 solid electrolytic capacitors for each of the examples and the comparative examples. Herein, the solid electrolytic capacitors had a rated voltage of minutes after application of the rated voltage. The BDV value indicates a breakdown voltage for the solid electrolytic capacitor measured by applying voltage increased at a rate of 1 V/s to the solid electrolytic capacitor at room temperature.

TABLE 2

|  | Short Circuit Occurrence Ratio (%) | Capacitance (μF) | Dielectric Loss Tangent (%) | ESR (mΩ) | Leak Current (μA) | BDV Value (V) |
|---|---|---|---|---|---|---|
| Example 1 | 22.3 | 24.9 | 2.3 | 26.2 | 8.9 | 59.3 |
| Example 2 | 9.6 | 25.4 | 2.4 | 27.1 | 4.3 | 63.5 |
| Example 3 | 1.8 | 25.3 | 2.6 | 27.3 | 0.5 | 67.1 |
| Example 4 | 0.5 | 25.5 | 2.8 | 28.2 | 0.9 | 70.9 |
| Example 5 | 0 | 25.4 | 3.2 | 30.5 | 0.3 | 72.3 |
| Example 6 | 0 | 25.1 | 3.7 | 35.2 | 0.4 | 75.4 |
| Example 7 | 0 | 25.5 | 5.5 | 99.6 | 0.1 | 80.2 |
| Example 8 | 21.3 | 25.4 | 2.5 | 27.0 | 10.2 | 60.4 |
| Example 9 | 10.5 | 25.1 | 2.3 | 27.2 | 3.5 | 62.2 |
| Example 10 | 1.5 | 25.2 | 2.7 | 27.9 | 1.1 | 66.9 |
| Example 11 | 0.5 | 25.4 | 2.7 | 28.6 | 0.5 | 71.2 |
| Example 12 | 0 | 25.2 | 3.1 | 31.2 | 0.4 | 72.1 |
| Example 13 | 0 | 25.2 | 3.9 | 34.2 | 0.2 | 74.7 |
| Example 14 | 0 | 25.4 | 6.2 | 109.1 | 0.2 | 82.8 |
| Example 15 | 21.5 | 25.1 | 2.5 | 26.0 | 11.0 | 58.3 |
| Example 16 | 2.2 | 25.3 | 2.7 | 26.5 | 2.0 | 64.2 |
| Example 17 | 0.8 | 25.6 | 3.2 | 30.2 | 1.8 | 67.9 |
| Example 18 | 0.1 | 25.8 | 4.5 | 38.5 | 0.8 | 71.3 |
| Comparative Example 1 | 28.5 | 24.7 | 2.3 | 26.7 | 18.4 | 55.8 |
| Comparative Example 2 | 4.1 | 23.9 | 3.2 | 40.9 | 3.2 | 65.9 |
| Comparative Example 3 | 2.5 | 22.7 | 4.9 | 63.3 | 2.8 | 68.5 |
| Comparative Example 4 | 0.8 | 20.3 | 5.6 | 121.2 | 1.5 | 70.3 |

It was found from the results in Table 2 that, in the solid electrolytic capacitors of Examples 1 to 18 and Comparative Examples 2 to 4 having the silane compound added thereto, the short circuit occurrence ratio and the generated amount of leak current were suppressed and the BDV value (voltage proof property) was improved, when compared with the solid electrolytic capacitor of Comparative Example 1 having no silane compound added thereto. Therefore, occurrence of a short circuit and increase of leak current can be suppressed and voltage proof property can be improved by containing a silane compound in a conductive polymer.

In addition, in the solid electrolytic capacitors of the examples in which the polymerization liquid was prepared by mixing one of the monomer and the oxidant with the silane compound beforehand, occurrence of a short circuit and increase of leak current were suppressed, and properties related to the capacitance, the ESR, and the BDV value were improved, in particular the property related to the ESR was significantly improved, when compared with the solid electrolytic capacitors of Comparative Examples 2 to 4 in which the polymerization liquid was prepared by simultaneously mixing the monomer, the oxidant, and the silane compound. This is because the properties of the conductive polymer were improved in the examples as they were not influenced by the heat of reaction of the silane compound, whereas the properties of the conductive polymer were degraded in Comparative Examples 2 to 4 as they were influenced by the heat of reaction of the silane compound. Therefore, occurrence of a short circuit and increase of leak current can be suppressed and the properties related to the capacitance, the ESR, and the BDV value can be improved by mixing one of a monomer and an oxidant with a silane compound beforehand.

Further, with an increase in the content of the silane compound in the conductive polymer, occurrence of a short circuit and increase of leak current were suppressed and the property related to the BDV value was improved, which were particularly significant when the weight percentage of the silane compound was 5 wt % or more. Therefore, the effects of suppressing occurrence of a short circuit and improving voltage proof property can be further enhanced by increasing the content of a silane compound in a conductive polymer.

Although the value of the ESR tends to be increased with an increase in the content of the silane compound in the conductive polymer, there is no practical problem as long as the weight percentage of the silane compound is 20 wt % or less. Therefore, the weight percentage of the silane compound is preferably 5 to 20 wt % to satisfy all of the short circuit property, the leak current property, the ESR property, and the voltage proof property in a solid electrolytic capacitor.

The embodiments and examples described above are merely provided to describe the present invention, and should not be interpreted as restricting the invention described in the scope of claims. The present invention can be freely modified within the scope of claims and within the scope having equivalent meaning. For example, although one embodiment of the present invention is a winding type solid electrolytic capacitor, it may be a chip type solid electrolytic capacitor, or a multi-layered solid electrolytic capacitor having a plurality of stacked capacitor elements. Further, a valve metal such as tantalum, niobium, titanium, or the like may be used for the anode body, other than aluminum.

What is claimed is:

1. A method of manufacturing a solid electrolytic capacitor including a capacitor element, the capacitor element having an anode body with a dielectric coating film formed on a surface thereof and a solid electrolyte made of a conductive polymer, the method comprising the steps of:
   forming the capacitor element having the anode body with the dielectric coating film formed on the surface thereof;
   preparing a polymerization liquid A containing a monomer as a precursor of the conductive polymer and a silane compound;
   preparing a polymerization liquid B by adding an oxidant to said polymerization liquid A; and
   forming said conductive polymer by performing polymerization after impregnating said capacitor element with said polymerization liquid B.

2. A method of manufacturing a solid electrolytic capacitor including a capacitor element, the capacitor element having an anode body with a dielectric coating film formed on a surface thereof and a solid electrolyte made of a conductive polymer, the method comprising the steps of:
   forming the capacitor element having the anode body with the dielectric coating film formed on the surface thereof;
   preparing a polymerization liquid A containing an oxidant and a silane compound;
   preparing a polymerization liquid B by adding a monomer as a precursor of the conductive polymer to said polymerization liquid A; and
   forming said conductive polymer by performing polymerization after impregnating said capacitor element with said polymerization liquid B.

3. The method of manufacturing a solid electrolytic capacitor according to claim 1, wherein the silane compound has a concentration of 5 to 20 wt % relative to a total weight of the monomer as the precursor of the conductive polymer, the oxidant, and the silane compound.

4. The method of manufacturing a solid electrolytic capacitor according to claim 2, wherein the silane compound has a concentration of 5 to 20 wt % relative to a total weight of the monomer as the precursor of the conductive polymer, the oxidant, and the silane compound.

5. The method of manufacturing a solid electrolytic capacitor according to claim 1, wherein, in the step of preparing said polymerization liquid B, the oxidant is added to said polymerization liquid A having a temperature of 5 to 40° C.

6. The method of manufacturing a solid electrolytic capacitor according to claim 2, wherein, in the step of preparing said polymerization liquid B, the monomer as the precursor of the conductive polymer is added to said polymerization liquid A having a temperature of 5 to 40° C.

* * * * *

UNITED STATES PATENT AND TRADEMARK OFFICE
CERTIFICATE OF CORRECTION

Page 1 of 1

PATENT NO. : 8,273,135 B2
APPLICATION NO. : 12/574276
DATED : September 25, 2012
INVENTOR(S) : Takeshi Furukawa et al.

It is certified that error appears in the above-identified patent and that said Letters Patent is hereby corrected as shown below:

In the Claims:

In Column 10, Claim 1, Line 8;
Delete

"including a capacitor element, the"

and insert

--a--

In Column 10, Claim 2, Line 22;
Delete

"including a capacitor element, the"

and insert

--a--

Signed and Sealed this
Twenty-eighth Day of May, 2013

Teresa Stanek Rea
*Acting Director of the United States Patent and Trademark Office*